Dec. 4, 1923.

W. A. MARTIN ET AL 1,476,630

HEADLIGHT ADJUSTING MECHANISM

Filed March 11, 1922   2 Sheets-Sheet 1

William A. Martin  Inventors
and Harry Kegel
By their Attorneys
Prindle Wright & Vinall

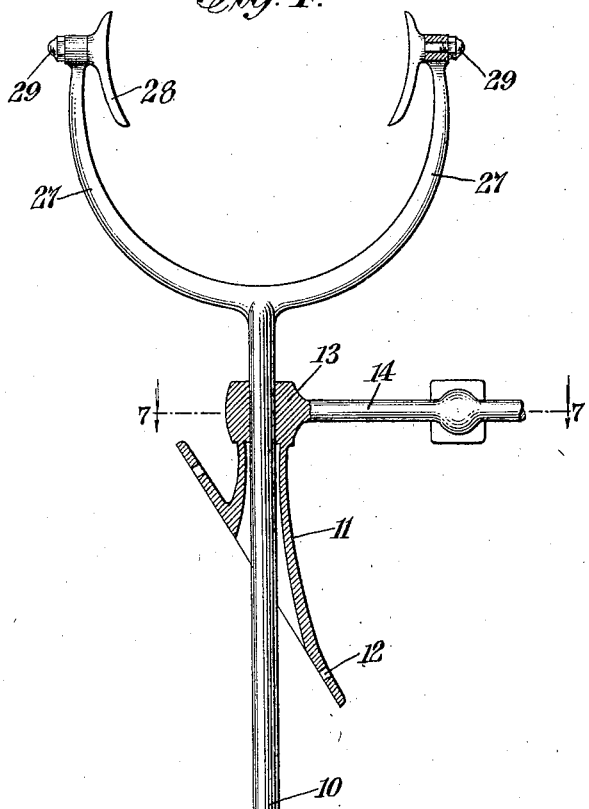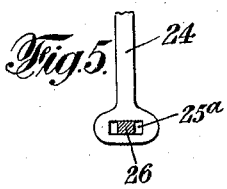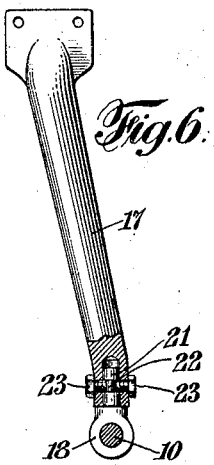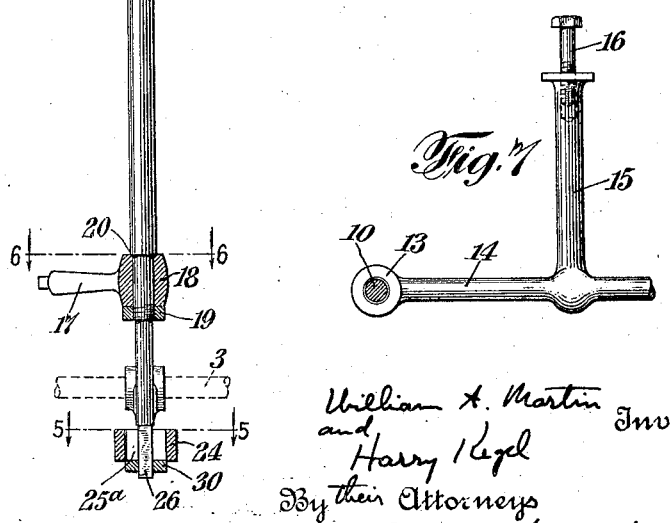

Patented Dec. 4, 1923.

1,476,630

UNITED STATES PATENT OFFICE.

WILLIAM A. MARTIN AND HARRY KEGEL, OF BROOKLYN, NEW YORK, ASSIGNORS OF ONE-THIRD TO SAID MARTIN, ONE-THIRD TO SAID KEGEL, AND ONE-THIRD TO FRANK B. CAMERON, OF BROOKLYN, NEW YORK.

HEADLIGHT-ADJUSTING MECHANISM.

Application filed March 11, 1922. Serial No. 542,840.

*To all whom it may concern:*

Be it known that we, WILLIAM A. MARTIN and HARRY KEGEL, citizens of the United States, residing at Brooklyn, county of Queens, State of New York, have invented a new and useful Headlight-Adjusting Mechanism, of which the following is a description.

The invention relates to a mechanism adapted to support the headlights commonly employed in connection with motor vehicles, and to turn such headlights automatically in accordance with the direction of motion of the vehicle, to insure that particularly when the vehicle is traveling in a curved path the light from the headlights will be projected in the direction in which the vehicle is moving.

One object of the mechanism is to provide a mechanism of the above character which will be properly relieved from strains due to shifting or relative motion between the parts of the vehicle to which the mechanism is connected, in order that, for example, the motion between different parts of the vehicle which is permitted by the springs, will not injure the headlight adjusting mechanism when the vehicle is passing over a rough road. It is also desired, however, to support the headlights adequately against vibration or looseness, as well as to relieve them from strains as above mentioned.

Another object of the invention is to provide a headlight adjusting mechanism which will involve but a relatively small number of simple elements of such character that they may be readily applied to vehicles of present day types to control the headlights in the manner above-mentioned.

Further objects and advantages of the invention will be in part obvious and in part specifically pointed out in the description hereinafter contained, which, taken in connection with the accompanying drawings, discloses a preferred embodiment thereof; such embodiment, however, is to be considered merely as illustrative of its principle. In the drawings:

Fig. 4 is a front elevation partly in section of a portion of the mechanism shown detached.

Figs. 5, 6 and 7 are detailed views of certain parts of the mechanism later to be described, such views being taken respectively on lines 5—5, 6—6 and 7—7 of Fig. 4, looking in the direction of the arrows.

Figure 1:
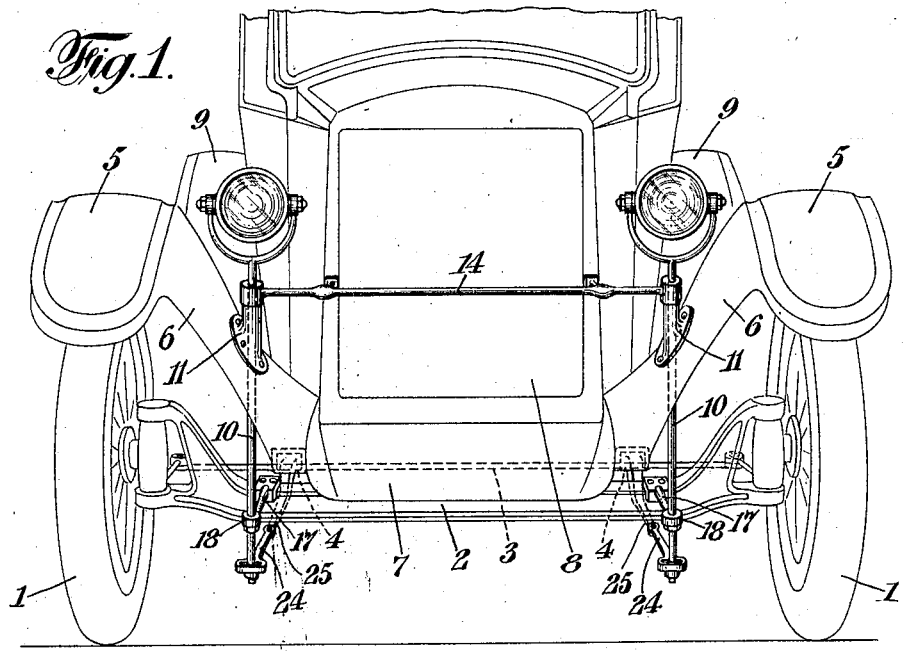
Fig. 1 is a front view of a motor vehicle equipped with a headlight adjusting mechanism constructed in accordance with the invention.
Figure 2:
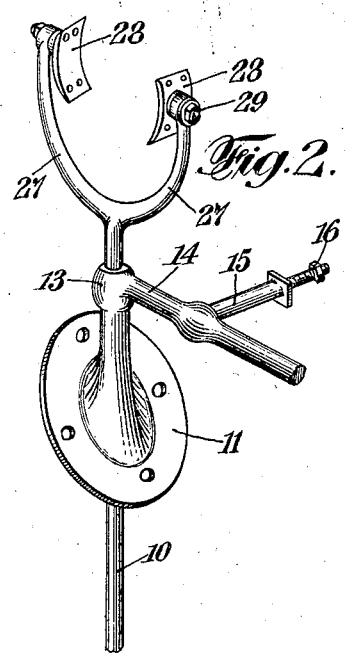
Figs. 2 and 3 are fragmentary perspective views showing respectively the portion of the mechanism adjacent the headlight, and a portion of the mechanism adjacent the frame of the vehicle.

Referring to the drawings, there is illustrated in Fig. 1 the forward portion of a motor vehicle having wheels 1 pivotally supported in any suitable manner from the front axle 2, the direction of the front wheels 1 being controlled by a steering rod 3, which may be understood as of any construction usually employed for such purposes. The frame work of the vehicle may also be understood as including the usual longitudinally extending beams secured to the front axle, and in the present instance the fenders or mud guards 5 are shown as provided with inclined sides 6 which are shaped to fit over the beams 4, and merge into an apron 7 disposed forwardly of the front axle 2, and underneath the radiator front 8.

The body of the vehicle, including the radiator front 8 and the fenders 5, is movable relative to the front axle and frame because of the springs (not illustrated) customarily employed in motor vehicles, with the result that if the headlights are to be connected to the steering mechanism of the vehicle, and also guided or supported by such parts as the fender or radiator front which move relative to the frame and steering mechanism, unless the headlight adjusting mechanism is specially constructed it is liable to become unduly strained or broken in use of the vehicle over rough roads.

According to the present invention, the vehicle head-lights 9 are suitably mounted adjacent the upper ends of a pair of headlight supporting rods 10, which may be turned to direct the headlights in the direction in which the vehicle is traveling, and which are so guided and supported by and between the frame of the vehicle and the fender or other parts which move with reference to the frame, as to be relieved from the strains which otherwise would be imposed upon the rods during the relative movement permitted by the vehicle springs.

In the present embodiment of the invention, the headlight supporting rods 10 extend upwardly through the inclined sides 6 of the fenders, and are guided therethrough by a pair of hollow posts 11 (Fig. 4) mounted on the fenders, and each having a base 12 adapted to fit against the corresponding side 6 of the fender, and a bearing 13 with regard to which rod 10 may slide up and down. In order to hold the posts 11 in proper position, we prefer to provide a bracing member 14 extending between them and also secured to the radiator front 8, as by means of arms 15 (Fig. 7) threaded to receive bolts 16 extending through the radiator front. Thus the hollow posts 11 are held in proper position relative to each other and to the body of the vehicle.

The headlight supporting rods 10, in the illustrated form of the invention, are also guided by and supported from the frame of the vehicle by means of brackets 17 secured to the front axle 2, and provided at their forward ends with hubs 18 which surround the rods, while nuts 19 threaded on to the rods 10 beneath the hubs 18, in conjunction with shoulders 20 (Fig. 4) on the rods above the hubs, serve to prevent the rods 10 from sliding relative to the brackets 17, and to support them from such brackets. The rods 10 are then provided adjacent their lower ends with suitable means, such as the parts hereinafter described, to turn the rods and the headlights supported thereby in accordance with the direction of motion of the vehicle.

As the springs of the vehicle yield, vertical motion between the body and frame thereof will not strain the rods 10 owing to the fact that such rods are slidable up and down as regards posts 11, and means is also provided whereby the rods will also be relieved from strains due to lateral or angular displacement between the body and frame. In the present instance the hubs 18, which support rods 10 from the frame, are rotatably carried by brackets 17; as shown in Fig. 6, the hub 18 may be provided with pins 21 extending into the ends of brackets 17 and provided with reduced portions 22 cooperating with set screws 23 which permit hubs 18 to move angularly while preventing them from becoming disengaged from their respective brackets. Thus as the body of the vehicle tilts or moves laterally with regard to the frame, hubs 18 permit the upper portions of such rods which pass through hollow posts 11 affixed to the vehicle body, to shift angularly with respect to the lower portions of rods which are supported from the vehicle frame, and the slidable connection between rods 10 and posts 11 takes up any up and down motion between the above parts of the vehicle.

Figure 3:
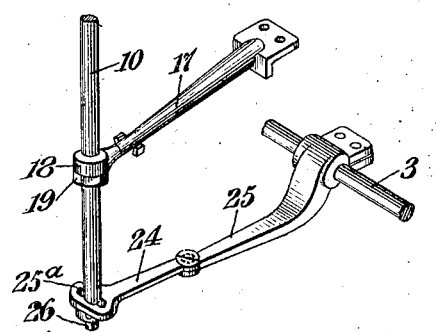

In the present embodiment, the rods 10 are turned to direct the headlights in accordance with the direction of motion of the vehicle, by means of links 24 engaging the lower ends of rods 10, and connected to the steering rod 3 by means of arms 25 (Fig. 3) clamped to steering rod 3 at their rear ends and pivoted to their respective links 24 at their forward ends. The links 24 are also preferably constructed to permit lateral shifting of the lower portion of rods 10; in the present instance, the links 24 are provided with slots $25^a$ which receive the square ends 26 of rods 10, and thus as arm 25 is moved back and forth with steering rod 3 the rods 10 are correspondingly turned, but in case the body of the vehicle shifts laterally or angularly with respect to the frame, the lower ends of rod 10 may move to permit this shifting without undue strains. As shown, the slotted ends of links 24 are supported by collars 30 (Fig. 4) fixed to the lower ends 26 of rods 10.

The headlights may be supported in any suitable manner from the upper end of rods 10. In the present instance, the rods are forked, and the forked arms 27 thereof carry the plates 28 (Fig. 4) which engage the headlights, such plates being pivotally mounted on a horizontal axis in the arms 27, and adjustable to any desired inclination by means of nuts 29. Thus the headlights may be positioned in any desired inclination, and, if desired, may be entirely reversed to throw their light rearwardly toward the engine of the vehicle.

While a specific embodiment of the invention has been described, it will be obvious that many changes may be made therein without departing from its spirit, as defined in the appended claims:

We claim:

1. In a vehicle, a headlight adjusting mechanism comprising a headlight supporting rod extending upwardly through the fender of the vehicle, means for supporting the rod from the frame of the vehicle, means for guiding the rod through the fender, said supporting means including a hub surrounding the rod and pivoted on an axis extending longitudinally of the vehicle to permit lateral shifting of the guided portion of the rod relative to the supported portion thereof, and means for turning the rod.

2. The combination set forth in claim 1, wherein said rod is vertically slidable with regard to said guiding means.

3. In a vehicle a headlight supporting mechanism, comprising a headlight supporting rod extending upwardly through the fender of the vehicle, a hollow post mounted upon said fender and slidably receiving said rod, a bracket extending from the frame and provided with means swiveled on an axis extending longitudinally of the vehicle and enclosing and supporting the rod adapted to permit angular movement thereof with reference to the frame of the vehicle, and means adjacent the lower end of the rod to turn the same in accordance with the direction of motion of the vehicle, said last-mentioned means being constructed to permit lateral shifting of the lower portion of the rod relative to said turning means while maintaining correct angular relation therebetween.

4. In a vehicle a headlight supporting mechanism, comprising a headlight supporting rod extending upwardly through the fender of the vehicle, a forwardly extending bracket attached to the frame of the vehicle, a hub rotatably carried by the bracket and enclosing the rod, a link having its forward end connected to the lower portion of said rod, and its rear end moving with the steering rod of the vehicle, means being provided between the link and rod wherein the lower portion of the rod may shift laterally with regard to said link but maintaining correct angular relation therebetween.

Dated, March 2nd, 1922.

WILLIAM A. MARTIN.
HARRY KEGEL.